March 6, 1928.  
S. DARY  
1,661,602  
MILK CAN WASHING MACHINE  
Filed March 5, 1926   2 Sheets-Sheet 2
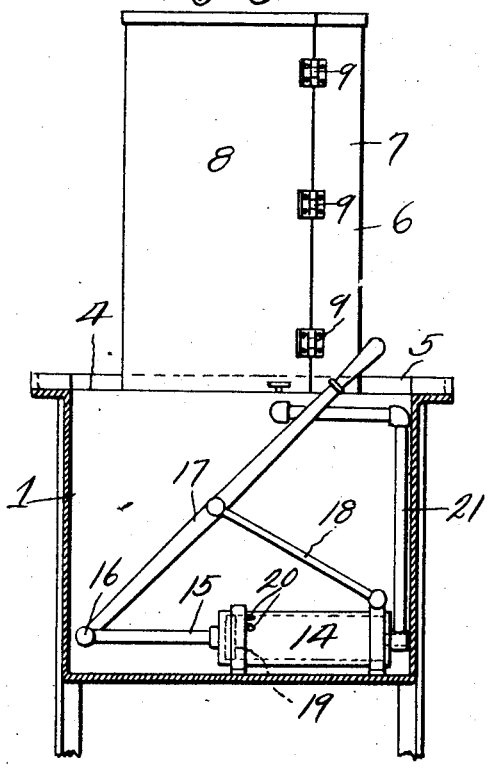
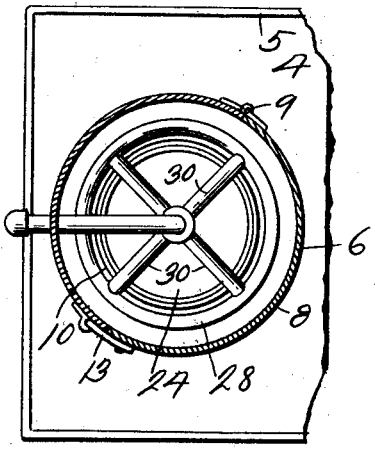
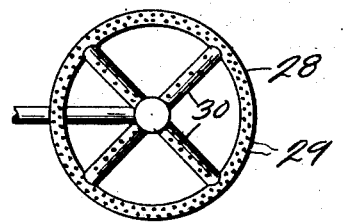
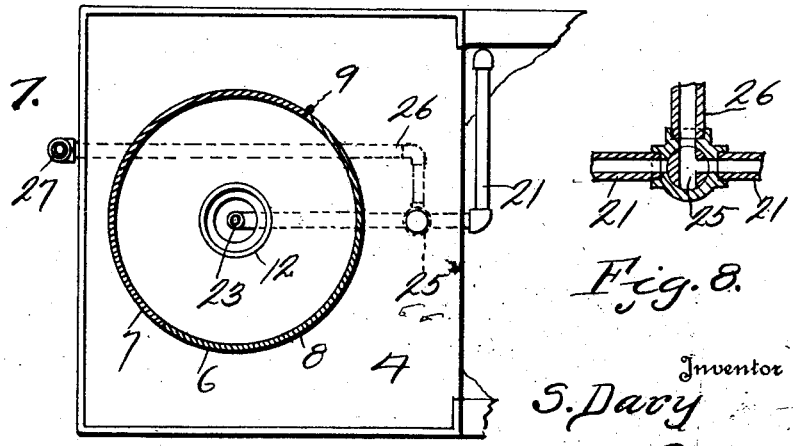

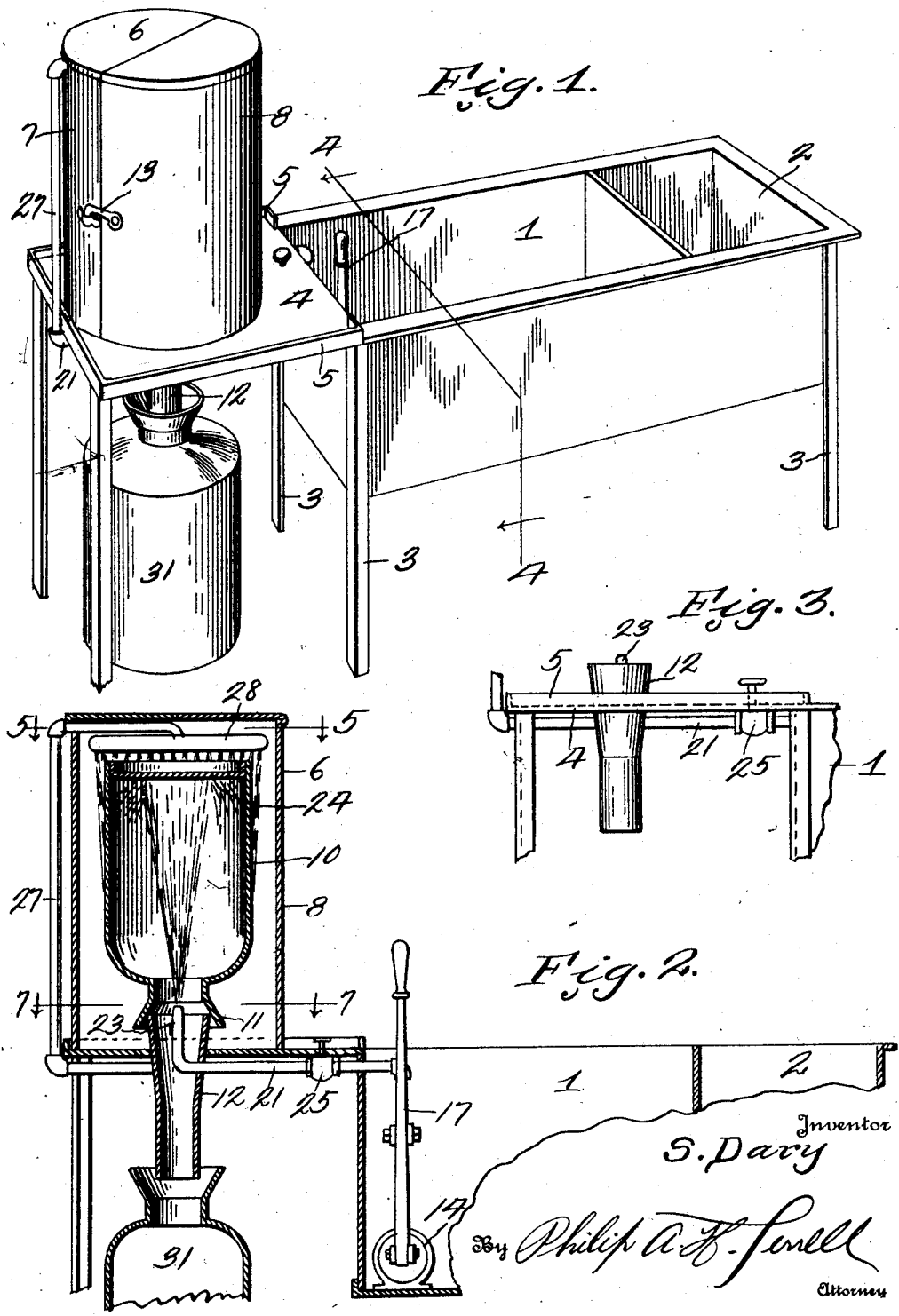

Patented Mar. 6, 1928.

1,661,602

UNITED STATES PATENT OFFICE.

SAMUEL DARY, OF GUTHRIE, OKLAHOMA.

MILK-CAN-WASHING MACHINE.

Application filed March 5, 1926. Serial No. 92,505.

The invention relates to milk can washing machines, and has for its object to provide a device of this character particularly adapted for rinsing cans of patrons who deliver their milk and cream at stations, and at which time the cans are emptied. It has been found the cans so delivered are exteriorly dirty and cream collects on the inner walls of the cans, and it is the object of the invention to provide a washing device which is simple and which is provided with a pump disposed in a tank, and by means of which pump water may be forced through pipes, particularly at a high temperature, and which water is projected against the side walls of the can and bottom, thereby cleansing and sterilizing the same and also into the can, thereby cleansing the interior of the can and washing out the cream which adheres to the can; the exterior washing preferably accomplished first for heating the can and loosening the cream therein, and the interior washing applied after the exterior washing for dislodging and washing the cream from the interior of the can.

A further object is to provide a discharge spout on which the can is supported and through which spout the dislodged cream flows to a receptacle.

A further object is to provide a control valve whereby the flow of water under the influence of the pump may be directed to the spraying device for cleansing the outside of the can, or to the spraying device for cleansing the inside of the can as desired.

A further object is to provide a cylindrical casing formed from hingedly connected sections, in which casing the can is placed in inverted position beneath the spraying device, and which casing prevents rapid cooling of the sprayed water and retains the heat around the can.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of the can washer.

Fig. 2 is a vertical longitudinal sectional view through the can washer.

Figure 3 is a side elevation of one end of the can washer showing the can casing removed to better show the structure.

Figure 4 is a vertical transverse sectional view taken on line 4—4 of Figure 1.

Figure 5 is a horizontal sectional view taken on line 5—5 of Figure 2.

Figure 6 is a bottom plan view of one of the spraying devices.

Figure 7 is a horizontal sectional view taken on line 7—7 of Figure 2 with the can removed to better show the structure.

Figure 8 is a horizontal sectional view through the two-way valve.

Referring to the drawings, the numeral 1 designates the main tank and 2 an auxiliary tank. Tanks 1 and 2 are supported by legs 3 and water within the tank 1 is adapted to be heated in any suitable manner. Extending outwardly from one end of the tank 1 is a shelf 4, which shelf is preferably provided with a marginal flange 5 whereby water, which may be discharged onto the shelf will drain back into the tank 1. Disposed on the shelf 4 is a cylindrical casing 6, which is formed from sections 7 and 8 which are hingedly connected together at 9. Section 7 is preferably stationary and when the operator places the can 10 therein in inverted position it is only necessary for the operator to open the section 8 and place the can within the casing with its discharge end 11 on the upper end of the discharge spout 12 and then close the section 8, which may be provided with a catch 13 if desired.

Disposed within the tank 1 is a pump 14 of a conventional form and which pump is provided with a pump rod 15 to the outer end of which is connected at 16 a lever 17, and which lever is provided with a link connection 18 with a stationary portion of the pump 14, therefore it will be seen that when the pump piston 19 is in the dotted line position shown in Figure 4, the pump will fill with water through the intake port 20, and when said piston 19 is forced inwardly, the water within the pump will be forced through the discharge pipe 21, which discharge pipe extends upwardly and through the end wall 22 of the tank 1, thence outwardly under the shelf 4, and terminates in an axially disposed discharge nozzle 23, which extends upwardly through the discharge spout 12 which supported the can 10 in an inverted position, therefore it will be seen that water will be sprayed under the force of the pump 14 against the inner side of the bottom 24 of the can 10 and the inner walls of the can, thereby thoroughly washing the cream which may adhere thereto from the can downwardly into the discharge spout 12. Pipe 21 is provided with a two-way valve 25, and by means of which valve 25, the water forced through the pipe 21 may be allowed to pass through the nozzle 23 or diverted through the branch pipe 26, which branch pipe terminates in an upwardly extending pipe 27, the upper ends of which extend horizontally into the upper end of the casing 1 and terminate in an annular spraying head 28, which is disposed above the bottom 14 of the can and has its perforations 29 located whereby the water discharged downwardly therefrom will engage the outer wall of the can 10, thereby thoroughly cleansing and washing the same. Annular spraying member 28 is provided with perforated cross pipes 30, which will discharge some of the water onto the bottom 24 of the can, thereby cleansing the same. In practice the operator manipulates the two-way valve 25 whereby the water will be first discharged onto the can 10 by the spraying device 28, which will cleanse the outer side of the can, and at the same time will heat the can so that the cream which has adhered to the inner side of the can may be easily dislodged so that the three-way valve 25 is positioned where the water is directed into the can for dislodging and washing the inner side of the can, and which dislodged material and water will flow through the discharge spout 12 into the receptacle 31. By providing the flange 5 around the shelf 4, the water which is used for cleansing the outside of the tank 1 may again be used. It will be noted a single pump is used for forcing the water through either pipe for washing the exterior or interior of the can, and in both of said washing operations the operation of the pump will be the same, and it will only be necessary for the operator to manipulate the two-way valve for directing the water from the external washing to the internal or from the internal to the external. The water within the tank 1 may be heated in any suitable manner.

From the above it will be seen that a milk can washing device is provided, which is particularly adapted for use in connection with milk collecting stations, and with which the cans can be thoroughly cleaned and sterilized, and at the same time the device may be easily transported if desired, is simple in construction and may be cheaply manufactured and sold.

The invention having been set forth what is claimed as new and useful is:—

The combination with means for supporting a can in inverted position, of a horizontally disposed annular spraying device above said can, said annular spraying device having its under side provided with apertures positioned whereby liquid will be discharged downwardly and inwardly towards the outer side of the can and crossed perforated discharge pipes carried by the annular spraying device and positioned whereby liquid will be discharged onto the adjacent end of the can.

In testimony whereof I hereunto affix my signature.

SAMUEL DARY.